(12) United States Patent
Ramirez Sanchez et al.

(10) Patent No.: US 11,594,953 B1
(45) Date of Patent: Feb. 28, 2023

(54) SYSTEM AND METHOD FOR OPERATING MULTI-LEVEL POWER CONVERTER USING A MULTI-STATE DEADTIME

(71) Applicant: General Electric Company, Schenectady, NY (US)

(72) Inventors: Fernando Arturo Ramirez Sanchez, Salem, VA (US); Nathaniel Robert Michener, Roanoke, VA (US); Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/506,790

(22) Filed: Oct. 21, 2021

(51) Int. Cl.
| | | |
|---|---|---|
| *H02M 1/38* | (2007.01) | |
| *H02M 7/487* | (2007.01) | |
| *H02M 7/5387* | (2007.01) | |
| *H02J 3/38* | (2006.01) | |
| *H02J 3/32* | (2006.01) | |
| *H02M 7/483* | (2007.01) | |

(52) U.S. Cl.
CPC ............... *H02M 1/38* (2013.01); *H02J 3/32* (2013.01); *H02J 3/381* (2013.01); *H02M 7/487* (2013.01); *H02M 7/53871* (2013.01); *H02J 2300/22* (2020.01); *H02J 2300/28* (2020.01); *H02M 7/4835* (2021.05)

(58) Field of Classification Search
CPC .... H02M 1/38; H02M 7/487; H02M 7/53871; H02M 7/4835; H02M 1/0095; H02M 1/08; H02M 5/458; H02M 7/5388; H02J 3/32; H02J 3/381; H02J 2300/28; H02J 2300/22; H02P 27/14
See application file for complete search history.

(56) References Cited

U.S. PATENT DOCUMENTS

| | | |
|---|---|---|
| 8,310,796 B2 | 11/2012 | Wagoner |
| 9,048,831 B2 | 6/2015 | Wagoner et al. |
| 9,184,650 B2 | 11/2015 | Shepard et al. |
| 9,362,859 B2 | 6/2016 | Wagoner et al. |
| 9,444,448 B2 | 9/2016 | Wagoner et al. |
| 9,496,864 B2 | 11/2016 | Wagoner et al. |

(Continued)

OTHER PUBLICATIONS

Co-Pending U.S. Appl. No. 17/405,311, filed Aug. 18, 2021.
Co-Pending U.S. Appl. No. 17/199,848, filed Mar. 12, 2021.

*Primary Examiner* — Adolf D Berhane
(74) *Attorney, Agent, or Firm* — Dority & Manning, P.A.

(57) ABSTRACT

A method for operating a multi-level bridge power converter of an electrical power system connected to a power grid includes providing a plurality of switching devices of the power converter in one of a neutral point clamped topology or an active neutral point clamped topology, the plurality of switching devices including a first group and a second group of switching devices. The method also includes providing a multi-state deadtime for the first and second groups of switching devices that changes based on different state transitions of the power converter. Further, the method includes operating the first and second groups of switching devices according to the multi-state deadtime to allow the first group to switch differently than the second group during the different state transitions, thereby decreasing voltage overshoots on the first group during one or more of the different state transitions and providing safe transition between commutation states of the power converter.

20 Claims, 8 Drawing Sheets

(56) References Cited

U.S. PATENT DOCUMENTS

| | | |
|---|---|---|
| 9,748,947 B1 | 8/2017 | Wagoner et al. |
| 10,356,228 B2 | 7/2019 | Shepard et al. |
| 11,258,387 B1 * | 2/2022 | Wagoner ............... H02M 7/487 |
| 11,296,612 B2 * | 4/2022 | Banda .................. H02M 5/458 |
| 11,462,992 B2 * | 10/2022 | Ramirez Sanchez . H02M 5/458 |
| 2022/0060123 A1 * | 2/2022 | Shaqqo ............... H02M 1/0003 |

* cited by examiner

SYSTEM AND METHOD FOR OPERATING MULTI-LEVEL POWER CONVERTER USING A MULTI-STATE DEADTIME

FIELD

The present disclosure relates generally to electrical power systems, and more particularly to a system and method for controlling an electrical power system having a multi-level power converter that uses a double transition deadtime for overshoot reduction.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Referring to FIGS. 1 and 2, a multilevel inverter neutral point clamped (NPC) topology and multilevel inverter diode recovery paths according to conventional construction are illustrated, respectively. In FIG. 1, the solid arrows indicate hard diode recovery, the dotted arrows indicate lossless recovery, and the boxed arrows indicate transitions controlled by the current direction. As such, the multilevel inverter topology leverages the series connection of multiple switching devices to reach higher operating voltages. For example, as shown, during switching operations of the three-level inverter, the AC terminal can be electrically connected to three possible voltages, i.e., positive, negative and midpoint. Furthermore, as shown, connection to the midpoint voltage is typically completed through diodes D5 and D6. However, the presence of these alternate paths lead to the creation of long and short commutation paths, and thus, different parasitic inductance levels.

More specifically, such differences create large voltage overshoots at the inner switching devices (e.g., S2 and S3) as well as different recovery paths during diode turn off, e.g., due to the increased parasitic inductance. As used herein, the turnoff overshoots are directly caused by energy stored in the parasitic inductances of the bridge construction. This energy is proportional to the size of the inductance and the magnitude of the current being commutated. This excess voltage overshoot can damage the affected devices, and requires a gate driver design that results in more losses and less margin in the power converter. Increased parasitic inductance can also negatively affect diode operation, thereby causing increased diode losses and reduced converter rating.

For example, as shown from Operating State 5 (OS5) to Operating State 3 (OS3) and from Operating State 2 (OS2) to Operating State 4 (OS4) in FIG. 2, diodes D1 and D4 have a long recovery path with high loop inductance, thereby resulting in larger losses in diodes D1 and D4. For example, as shown in FIG. 3, a plurality of insulated gate bipolar transistor (IGBT) modules are illustrated, in which a transition from Operating State 5 (OS5) to Operating State 3 (OS3) causes a long recovery path RP for diode D4. More particularly, as shown, the recovery path RP has to physically cover the entire phase module, thereby leading to high loop inductance.

Such losses translates to more heat and lower bridge rating. Thus, typical solutions for reducing the voltage overshoots include soft switching and/or snubber circuits, which can cause slower switching speeds and increased costs.

A solution to the voltage overshoot problem is to switch the IGBTs more slowly by reducing the turn off speed with the gate driver design (reducing the rate of charge extraction from the IGBT gate). However, this causes increased losses, and reduces the efficiency of the power converter, so it is better to only switch the inner devices slowly, and to maintain fast switching on the outer devices.

Additionally, when switching IGBTs in a multi-level power converter, it is necessary to provide a lockout time or deadtime during which the power converter is held in a safe state, while one switch finishes turning off, prior to turning the next switch on. However, this deadtime presents a problem in that it causes distortion of the output signal of the power converter, in proportion with the length of the deadtime (i.e., a longer deadtime results in more distortion), thereby creating the necessity for larger heavier filter circuits. Some control strategies also deal with selecting the most optimal switch transition based on the current direction. Nonetheless, this is not possible when the instantaneous current is low (i.e., during zero crossing in an AC waveform).

Accordingly, the present disclosure is directed to a system and method for controlling an electrical power system having a multi-level power converter that uses a double transition deadtime for overshoot reduction to address the aforementioned issues. More particularly, the present disclosure is directed to a system and method that utilizes a composite, multiple stage deadtime for both safe transition between commutation states and voltage overshoot reduction.

BRIEF DESCRIPTION

Aspects and advantages of the disclosure will be set forth in part in the following description, or may be obvious from the description, or may be learned through practice of the disclosure.

In one aspect, the present disclosure is directed to a method for operating a multi-level bridge power converter of an electrical power system connected to a power grid. The power converter includes a first converter coupled to a second converter via a DC link. The method includes providing a plurality of switching devices of the power converter in one of a neutral point clamped topology or an active neutral point clamped topology. The plurality of switching devices include a first group of switching devices and a second group of switching devices. The method also includes providing a multi-state deadtime for the first and second groups of switching devices of the power converter that changes based on different state transitions of the power converter. Further, the method includes operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter.

In an embodiment, the plurality of switching devices includes, at least, a plurality of insulated gate bipolar transistor (IGBT) modules. In such embodiments, each of the plurality of IGBT modules includes at least one IGBT switch and at least one antiparallel diode.

In another embodiment, the plurality of IGBT modules includes a first IGBT module having a first IGBT switch coupled to a first antiparallel diode, a second IGBT module having a second IGBT switch coupled to a second antiparallel diode, a third IGBT module having a third IGBT switch coupled to a third antiparallel diode, a fourth IGBT module having a fourth IGBT switch coupled to a fourth antiparallel diode, a fifth IGBT module having a fifth IGBT switch coupled to a fifth antiparallel diode, and a sixth IGBT module having a sixth IGBT switch coupled to a sixth antiparallel diode.

In further embodiments, the first group of the plurality of switching devices includes inner switching devices of the plurality of switching devices and the second group of the plurality of switching devices includes outer switching devices. In additional embodiments, for example, the second IGBT module, the third IGBT module, the fifth IGBT module, and the sixth IGBT module are the inner switching devices, and wherein the first IGBT module and the fourth IGBT module are the outer switching devices.

In an embodiment, operating the first and second groups of switching devices according to the multi-state deadtime to allow the first group of switching devices to switch differently than the second group of switching devices during different state transitions may include, when transitioning from a midpoint voltage state to a positive or negative voltage state, turning off the second and third IGBT modules while maintaining an alternate current path through the fifth and sixth IGBT modules, thereby effectively decreasing an amount of energy dissipated on the second and third IGBT modules during turn off In another embodiment, operating the first and second groups of switching devices according to the multi-state deadtime to allow the first group of switching devices to switch differently than the second group of switching devices during different state transitions may include, when transitioning from the midpoint voltage state to the positive or negative voltage state and once the second and third IGBT modules are turned off, turning off the fifth and sixth IGBT modules, thereby effectively interrupting a phase module current.

In further embodiments, transitioning from the midpoint voltage state to the positive or negative voltage state occurs regardless of a current direction of the fifth and sixth IGBT modules.

In an embodiment, operating the first and second groups of switching devices according to the multi-state deadtime to allow the first group of switching devices to switch differently than the second group of switching devices during different state transitions may include, when transitioning from the positive or negative voltage state to the midpoint voltage state, turning on the second and third IGBT modules and the fifth and sixth IGBT modules at the same time.

In additional embodiments, the method may include operating the plurality of switching devices at the multi-state deadtime via a plurality of gate drivers.

In particular embodiments, the multi-level bridge power converter is a three-level bridge power converter. In further embodiments, the electrical power system may be a wind turbine power system, a solar power system, an energy storage power system, or combinations thereof.

In another aspect, the present disclosure is directed to an electrical power system. The electrical power system includes a doubly-fed induction generator having a rotor and a stator, with the stator providing AC power to a stator bus. The electrical power system also includes a multi-level bridge power converter coupled to the rotor of the doubly-fed induction generator. The power converter includes a first converter coupled to a second converter via a DC link. At least one of the first converter or the second converter includes a plurality of switching devices arranged in one of a neutral point clamped topology or an active neutral point clamped topology. The plurality of switching devices includes a first group of switching devices and a second group of switching devices. The electrical power system also includes a controller communicatively coupled to the power converter. The controller includes at least one processor configured to implement a plurality of operations, including but not limited to providing a multi-state deadtime for the first and second groups of switching devices of the power converter that changes based on different state transitions of the power converter and operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter. It should be understood that the electrical power system may further include any of the additional steps and/or features described herein.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
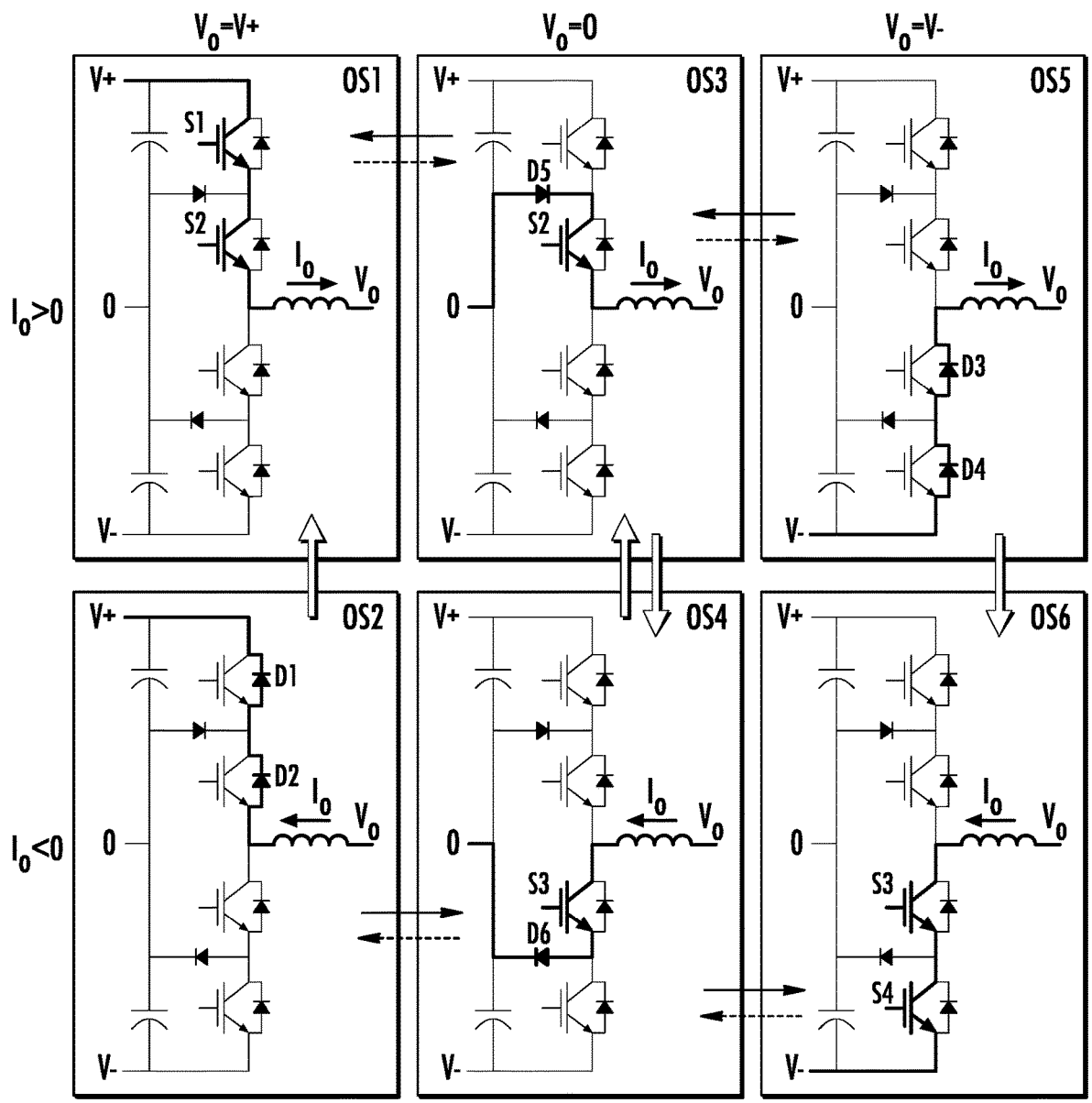
FIG. 1 illustrates a schematic diagram of a switching sequence of a three-level inverter according to conventional construction.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In general, the present disclosure is directed to a system and method for controlling an electrical power system having a multi-level power converter that uses a double transition deadtime. Thus, an objective of the present disclosure is to decrease the voltage overshoot on the inner switching devices when transitioning from midpoint to a positive or negative state. In particular, the transition is performed in a manner that the inner switching devices (e.g., S2 and S3) are turned off while maintaining an alternate current path through the outer switching devices (e.g., S5 and S6). Once S2 and S3 are off, the outer switching devices are turned off, thereby effectively interrupting the phase module current. This transition happens regardless of the current direction of the switch. On the other hand, when the multi-level power converter is transitioning from positive or negative into a mid-point voltage, both the inner and outer switching devices can be safely turned on at the same time. Thus, a single dead time is used to allow for the outer switching devices to turn off.

It should be appreciated that numerous advantages may be provided by operating a power converter as described herein. For example, the present disclosure is configured to decrease losses on the inner switching devices, reduce large overshoots on the inner switching devices that could require higher voltage devices at the inner IGBT positions, improves the power range of the power converter, and/or negates the need for snubbers at the inner switching devices. In addition, the systems and methods of the present disclosure can be applied to many electrical power systems, such as a wind turbine power system, a solar power system, an energy storage power system, or combinations thereof. Further, the present disclosure does not require additional hardware. Moreover, the present disclosure enables the power converter to extend its safe operating area (SOA) without adding more semiconductors.

Figure 2:
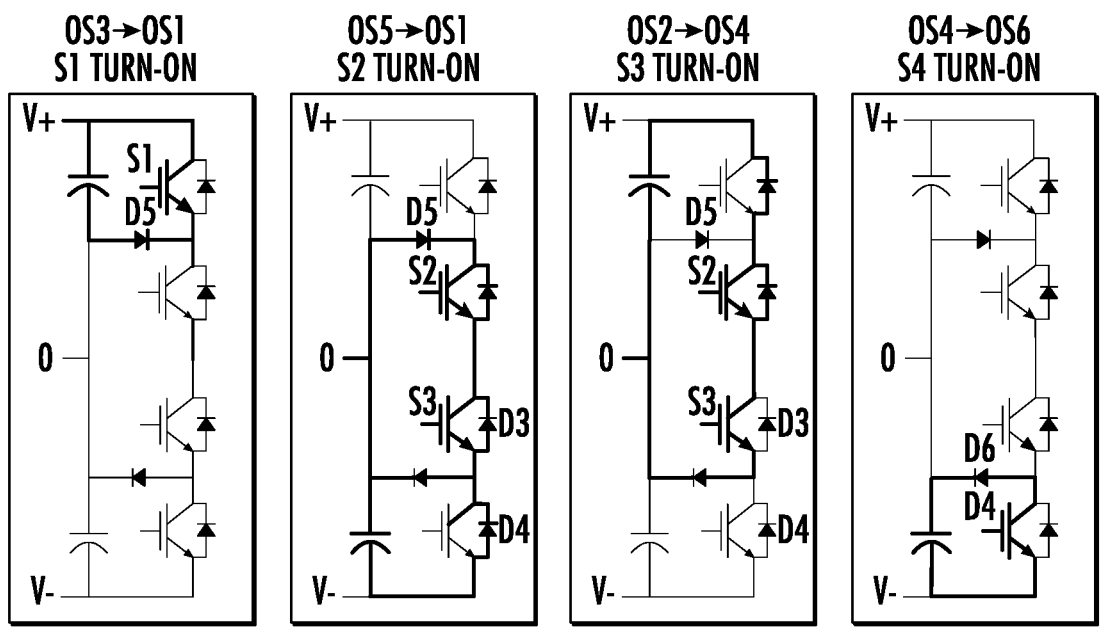
FIG. 2 illustrates a schematic diagram of diode recovery paths for a three-level inverter according to conventional construction.
Figure 4:
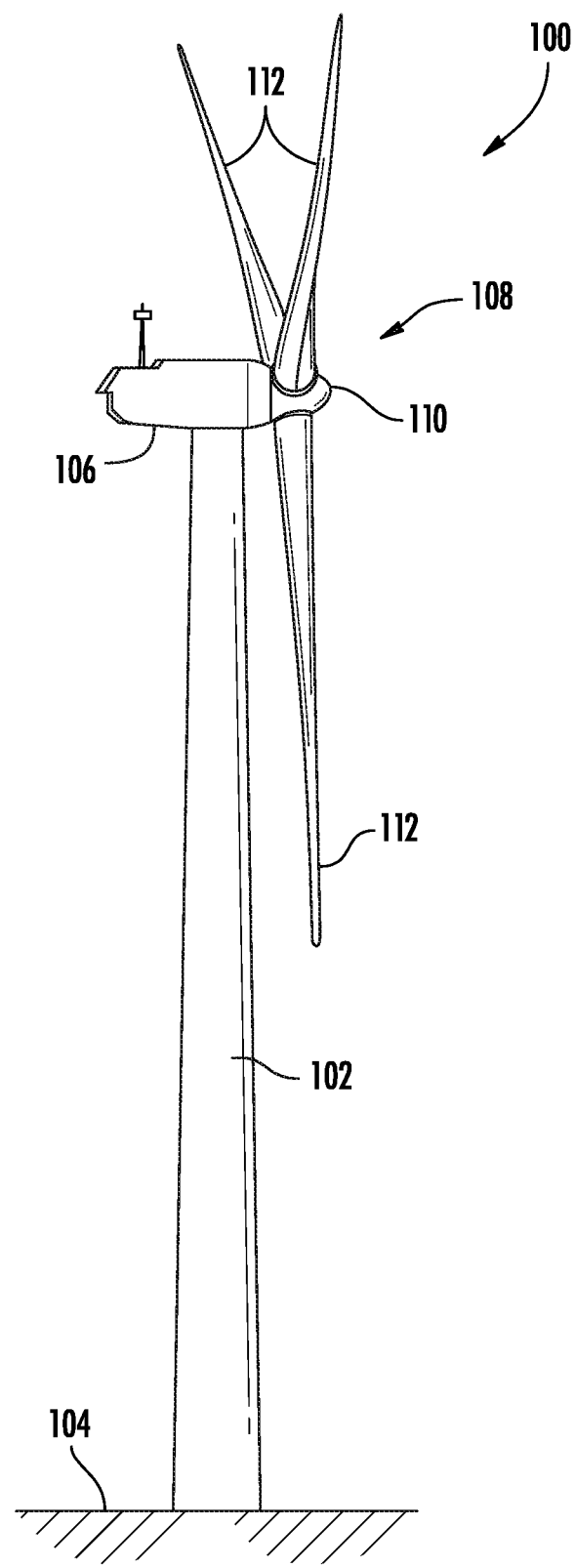
FIG. 4 illustrates a perspective view of one embodiment of a wind turbine according to the present disclosure.

Referring now to the drawings, FIG. 4 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 10. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to an electric generator 220 (FIG. 2) to permit electrical energy to be produced.

Figure 5:
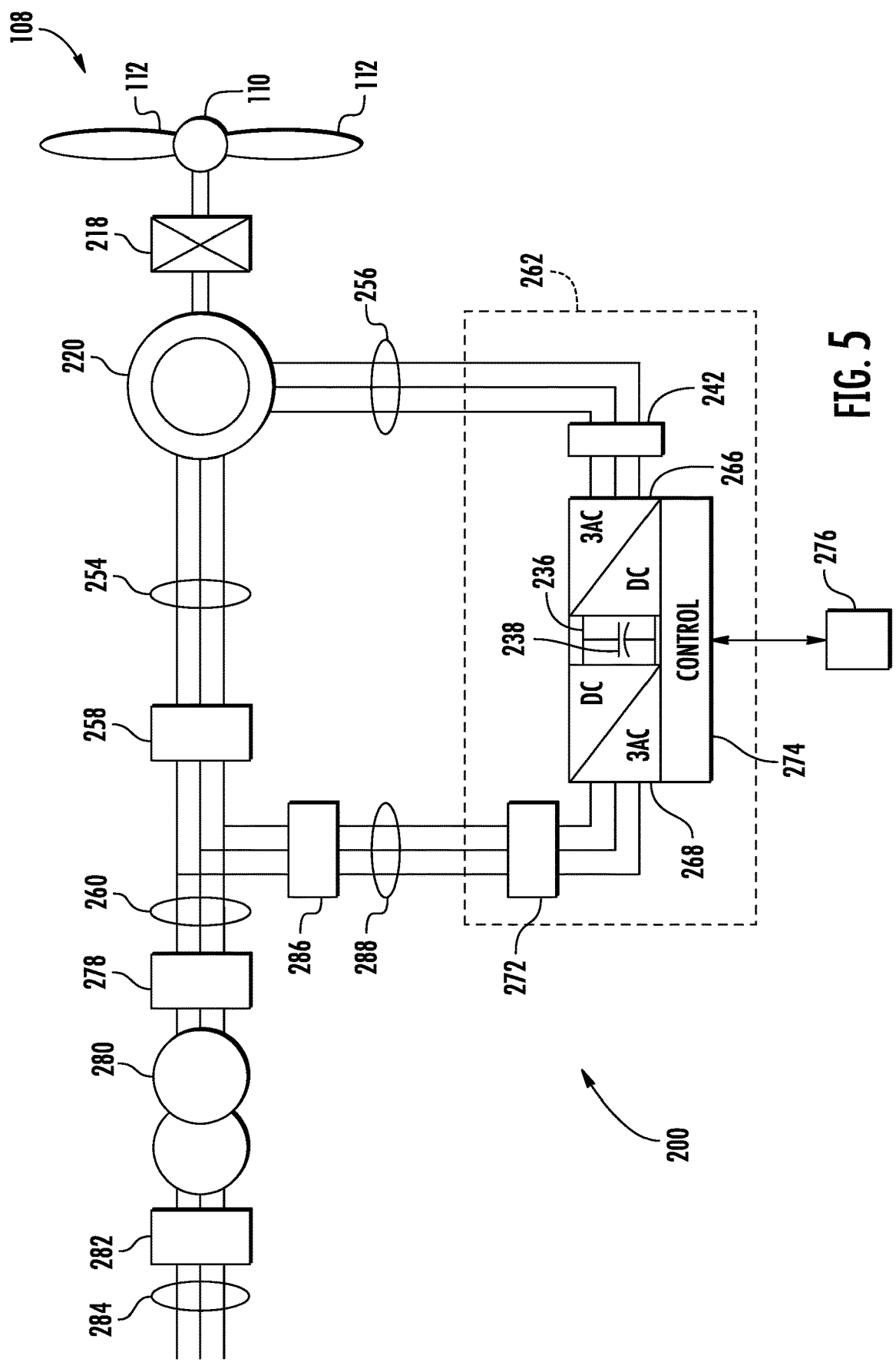
FIG. 5 illustrates a schematic diagram of one embodiment of a DFIG wind turbine system according to the present disclosure.

Referring now to FIG. 5, a schematic diagram of one embodiment of a DFIG wind turbine system 200 is illustrated in accordance with aspects of the present subject matter. It should be appreciated that the present subject matter will generally be described herein with reference to the system 200 shown in FIG. 5. However, those of ordinary skill in the art, using the disclosures provided herein, should understand that aspects of the present disclosure may also be applicable in other power generation systems.

As shown, the rotor 108 of the wind turbine 100 may, optionally, be coupled to a gear box 218, which is, in turn, coupled to a generator 220. In accordance with aspects of the present disclosure, the generator 220 is a doubly-fed induction generator (DFIG). For example, as shown, the DFIG 220 may be coupled to a stator bus 254 and a power converter 262 via a rotor bus 256. The stator bus 254 may provide an output multiphase power (e.g., three-phase power) from a stator of the DFIG 220 and the rotor bus 256 may provide an output multiphase power (e.g., three-phase power) from a rotor of the DFIG 120. As shown in FIG. 5, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288. In particular embodiments, the power converter 262 may be a multi-level bridge power converter, such as a three-level bridge power converter, or higher. As described herein, three-level converters are converters that have three direct current (DC) poles. In addition to positive and negative DC poles, such converters also have a neutral DC pole.

Figure 3:
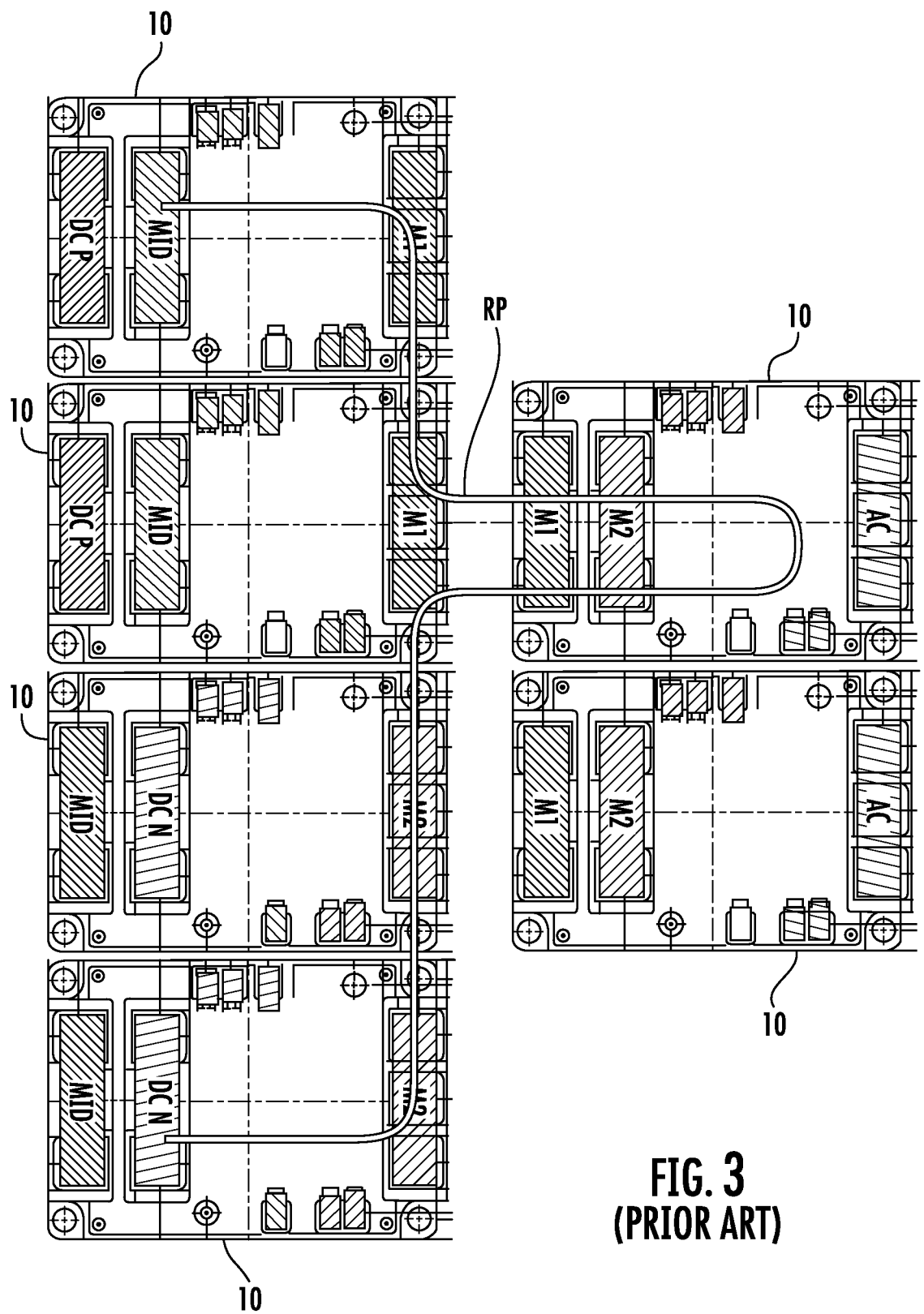
FIG. 3 illustrates a schematic diagram of a plurality of IGBT modules connected according to conventional construction, particularly illustrating a long recovery path for diode D4.

In several embodiments, the rotor side converter 266 and the line side converter 128 may be configured for normal operating mode in a three-phase, pulse width modulation (PWM) arrangement using insulated gate bipolar transistor (IGBT) switching devices as will be discussed in more detail with respect to FIG. 3. The rotor side converter 266 and the line side converter 268 may be coupled via a DC link 236 across which is a DC link capacitor 238.

In addition, the power converter 262 may be coupled to a controller 274 in order to control the operation of the rotor side converter 266 and the line side converter 268. It should be noted that the controller 274 may, in several embodiments, be configured as an interface between the power converter 262 and a control system 276. The controller 274 may include any number of control devices. In one embodiment, the controller 274 may include a processing device (e.g., microprocessor, microcontroller, etc.) executing computer-readable instructions stored in a computer-readable medium. The instructions when executed by the processing device may cause the processing device to perform operations, including providing control commands to the switching devices and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g., three-phase) alternating current (AC) power is provided to the power converter 262. The rotor side converter 266 converts the AC power provided from the rotor bus 256 into direct current (DC) power and provides the DC power to the DC link 236. As is generally understood, switching devices (e.g., IGBTs) used in the bridge circuits of the rotor side converter 266 may be modulated to convert the AC power provided from the rotor bus 256 into DC power suitable for the DC link 236.

In addition, the line side converter 268 converts the DC power on the DC link 126 into AC output power suitable for the electrical grid 124. In particular, switching devices (e.g., IGBTs) used in bridge circuits of the line side power converter 268 can be modulated to convert the DC power on the DC link 236 into AC power on the line side bus 288. The AC power from the power converter 262 can be combined with the power from the stator of DFIG 220 to provide multi-phase power (e.g., three-phase power) having a frequency maintained substantially at the frequency of the electrical grid 284 (e.g., 50 Hz or 60 Hz).

Additionally, various circuit breakers and switches, such as grid breaker 282, system breaker 278, stator sync switch 258, converter breaker 286, and line contactor 272 may be included in the system 200 to connect or disconnect corresponding buses, for example, when current flow is excessive and may damage components of the wind turbine 100 or for other operational considerations. Additional protection components may also be included in the DFIG wind turbine system 200, such as the crowbar circuit described below.

Moreover, the power converter 262 may receive control signals from, for instance, the control system 276 via the controller 274. The control signals may be based, among other things, on sensed conditions or operating characteristics of the DFIG wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g., three-phase) power supply. Other feedback from other sensors may also be used by the controller 274 to control the power converter 262, including, for example, stator and rotor bus voltages and current feedbacks. Using the various forms of feedback information, switching control signals (e.g., gate timing commands for IGBTs), shorting control signals, stator synchronizing control signals, and circuit breaker signals may be generated.

Figure 6:
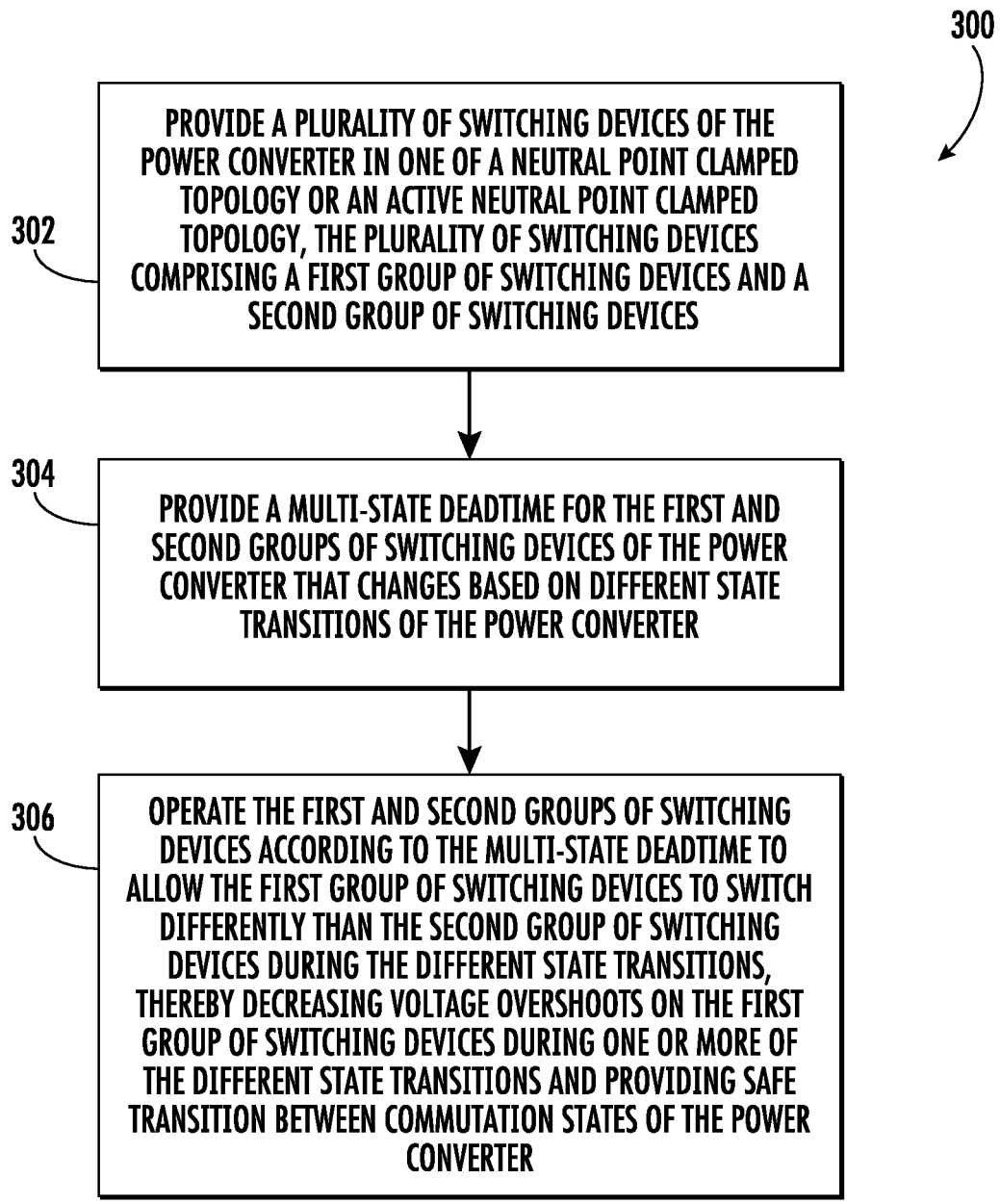
FIG. 6 illustrates a flow diagram of one embodiment of a method for operating a multi-level bridge power converter of an electrical power system connected to a power grid according to the present disclosure.

Referring now to FIG. 6, a flow diagram of one embodiment of a method 300 for operating a multi-level bridge power converter of an electrical power system connected to a power grid is illustrated in accordance with aspects of the present subject matter. In general, the method 300 will be described herein as being implemented using a wind turbine system, such as the DFIG wind turbine system 200 described above with reference to FIGS. 1-5. However, it should be appreciated that the disclosed method 300 may be implemented using any other suitable power generation system that is configured to supply power for application to a load. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

Figure 7:
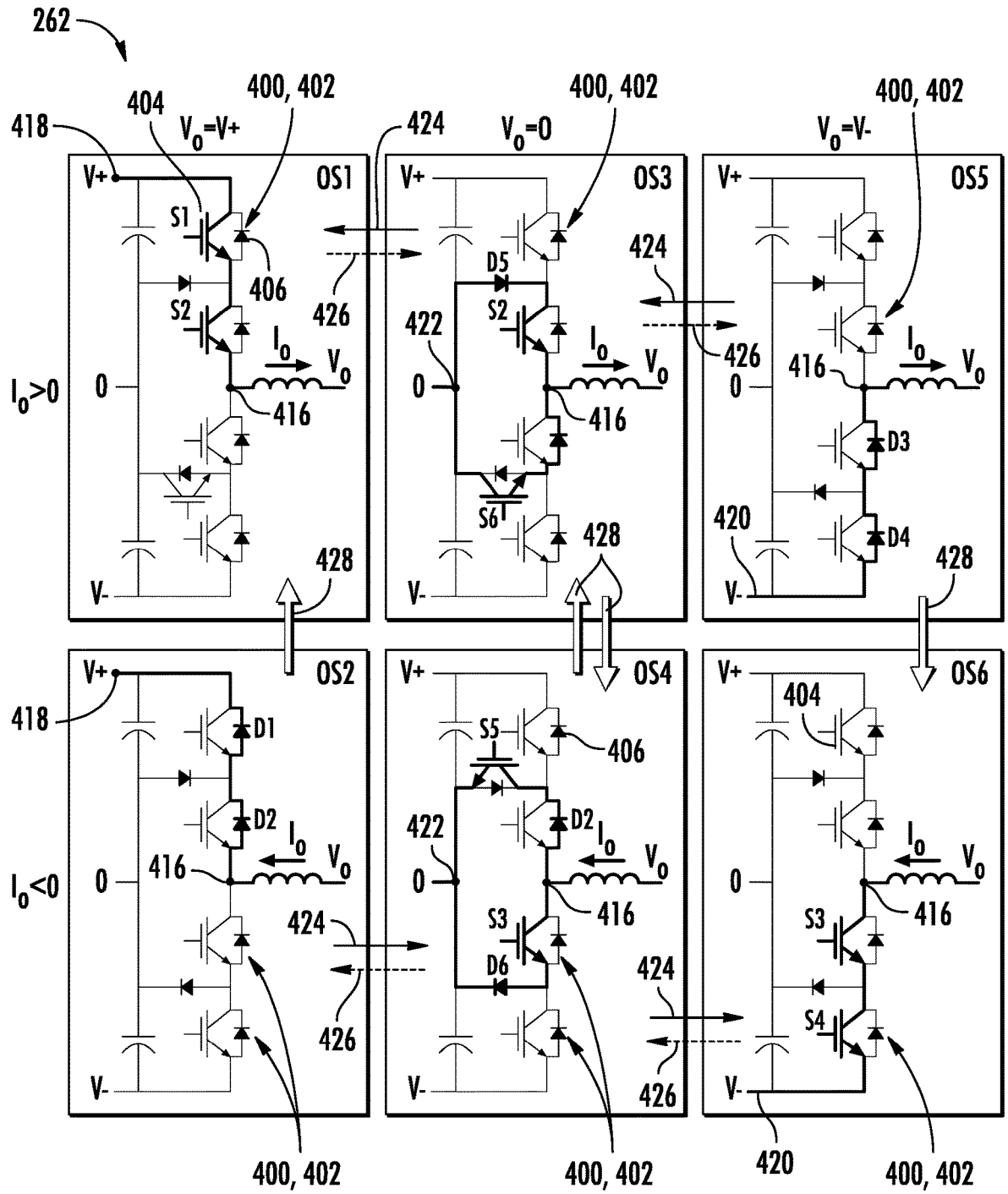
FIG. 7 illustrates a schematic diagram of a switching sequence of a three-level inverter according to the present disclosure.
Figure 8:
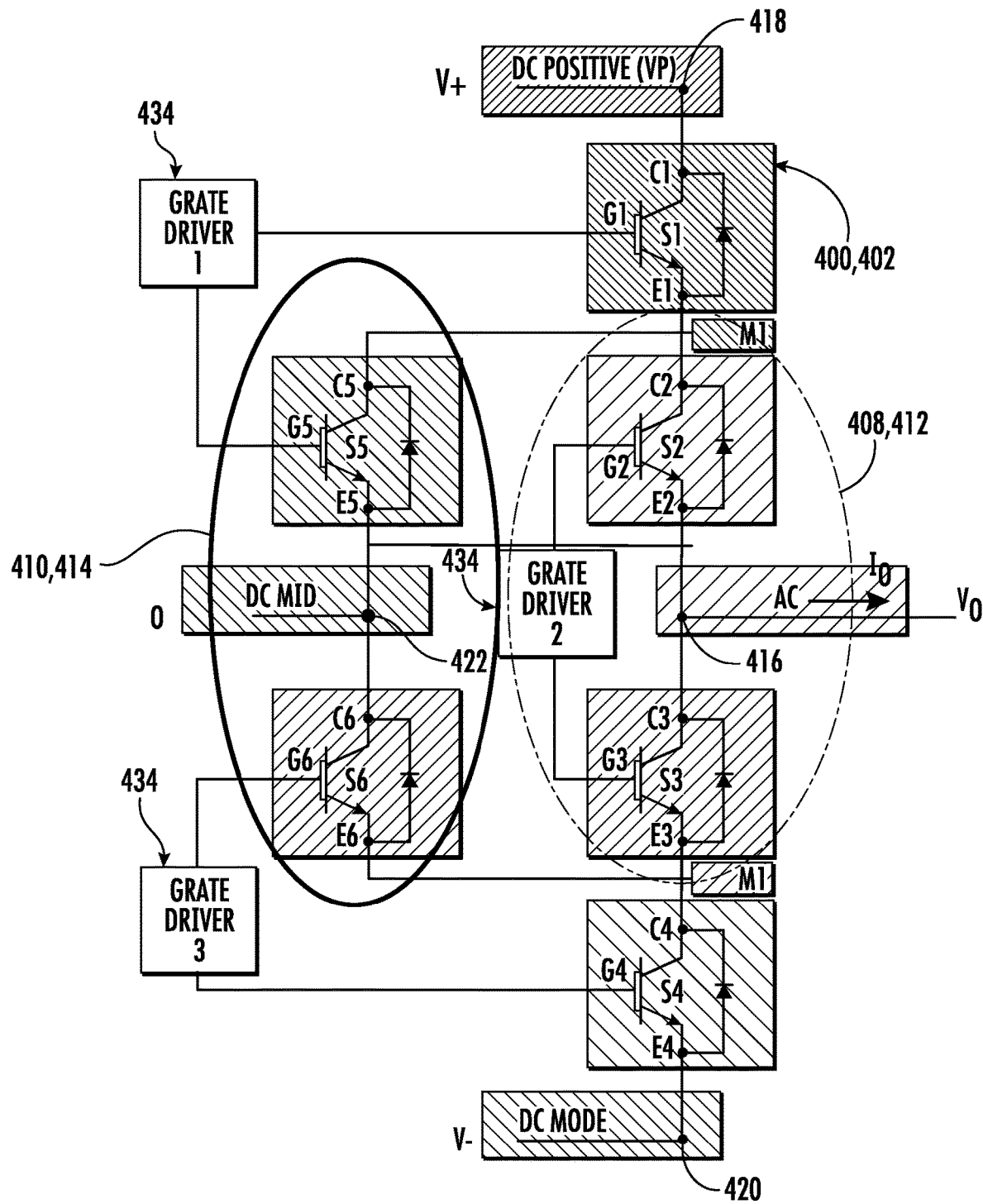
FIG. 8 illustrates a schematic diagram of a plurality of IGBTs connected according to the present disclosure.

As shown at (302), the method 300 includes providing a plurality of switching devices 400 of the power converter 262 in one of a neutral point clamped topology or an active neutral point clamped topology. For example, as shown in FIGS. 7-8, the switching devices 400 may be insulated gate bipolar transistor (IGBT) modules 402. In such embodiments, as shown, each of the plurality of IGBT modules 402 may include at least one IGBT switch 404 (also numbered S1, S2, S3, S4, S5, and S6) and at least one antiparallel diode 406. Furthermore, as shown particularly in FIG. 9, the plurality of switching devices 400 may include a first group 408 and a second group 410 of switching devices 400. In such embodiments, as shown, the first group 408 may correspond to one or more inner switching devices 412, whereas the second group 410 may correspond to one or more outer switching devices 414. More specifically, as shown, the second IGBT module S2 and the third IGBT module S3 are the inner switching devices 412, and the fifth IGBT module S5 and the sixth IGBT module S6 are the outer switching devices 414.

In addition, as shown in FIGS. 7 and 8, the power converter 262 may include various terminals, such as an alternating current (AC) terminal 416, a positive voltage terminal 418, a negative voltage terminal 420, and a midpoint voltage terminal 422 that can be used to control the various operating states of the power converter 262.

Referring back to FIG. 6, as shown at (304), the method 300 includes providing a multi-state deadtime for the first and second groups 408, 410 of switching devices 400 of the power converter 262 that changes based on different state transitions of the power converter 262. Thus, as shown at (306), the method 300 includes operating the first and second groups 408, 410 of switching devices 400 according to the multi-state deadtime to allow the first group 408 of switching devices 400 to switch differently than the second group 410 of switching devices 400 during the different state transitions, thereby decreasing voltage overshoots on the first group 408 of switching devices 400 during one or more of the different state transitions and providing safe transition between commutation states of the power converter 262.

In an embodiment, for example, when transitioning from the midpoint voltage state to the positive or negative voltage state, operating the first and second groups 408, 410 of switching devices 400 according to the multi-state deadtime may include turning off the second and third IGBT modules S2, S3 while maintaining an alternate current path through the fifth and sixth IGBT modules S5, S6, thereby effectively decreasing an amount of energy dissipated on the second and third IGBT modules S2, S3 during turn off. In addition, in an embodiment, when transitioning from the midpoint voltage state to the positive or negative voltage state and once the second and third IGBT modules S2, S3 are turned off, operating the first and second groups 408, 410 of switching devices 400 according to the multi-state deadtime may include turning off the fifth and sixth IGBT modules, thereby effectively interrupting a phase module current.

In further embodiments, transitioning from the midpoint voltage state to the positive or negative voltage state occurs regardless of a current direction of the fifth and sixth IGBT modules S5, S6.

In another embodiment, when transitioning from the positive or negative voltage state to the midpoint voltage state, operating the first and second groups 408, 410 of switching devices 400 according to the multi-state deadtime may include turning on the second and third IGBT modules S2, S3 and the fifth and sixth IGBT modules S5, S6 at the same time.

In additional embodiments, the method 300 may include operating the plurality of switching devices 400 at the multi-state deadtime via a plurality of gate drivers. For example, as shown in FIG. 9, in an embodiment, the method 300 may optionally include electrically coupling a gate driver 434 at a connection between one or more of the first and fifth IGBT modules S1, S5, the second and third IGBT modules 2, 3, and/or the fourth and sixth IGBT modules S4, S6. Thus, in particular embodiments, as shown, the gate drivers 434 are connected to respective gates (e.g., G1, G2, G3, G4, G5, and G6) of the IGBT modules 402.

Thus, the present disclosure provides an alternate double transition dead time. Due to the inverter structure, the inner switching devices 412 (S2, S3) tend to experience larger voltage overshoots when compared to the ANPC devices (S5, S6). Accordingly, an objective of the present disclosure is to decrease the voltage overshoot on the inverter inner switching devices when transitioning from midpoint to a positive or negative state. The transition is performed in a manner that S2, S3 are turned off while keeping an alternate current path through the ANPC devices (S5, S6), thereby effectively decreasing the amount of energy dissipated on the device(s) during turn of. Once S2 and S3 are off, the ANPC devices (S5, S6) are turned off, effectively interrupting the phase module current. This transition happens regardless of the current direction of the switch. On the other hand, when the inverter is transitioning from the positive or negative state into a mid-point voltage state, both the inner and ANPC switches can be safely turned on at the same time. Thus, a single dead time is used to allow for the outer IGBT to turn off.

Further aspects of the disclosure are provided by the subject matter of the following clauses:

Clause 1. A method for operating a multi-level bridge power converter of an electrical power system connected to a power grid, the power converter having a first converter coupled to a second converter via a DC link, the method comprising:

providing a plurality of switching devices of the power converter in one of a neutral point clamped topology or an active neutral point clamped topology, the plurality of switching devices comprising a first group of switching devices and a second group of switching devices;

providing a multi-state deadtime for the first and second groups of switching devices of the power converter that changes based on different state transitions of the power converter; and operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter.

Clause 2. The method of clause 1, wherein the plurality of switching devices comprises, at least, a plurality of insulated gate bipolar transistor (IGBT) modules, wherein each of the plurality of IGBT modules comprises at least one IGBT switch and at least one antiparallel diode.

Clause 3. The method of clause 2, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode.

Clause 4. The method of clause 3, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

Clause 5. The method of clause 4, wherein operating the first and second groups of switching devices according to the multi-state deadtime to allow the first group of switching devices to switch differently than the second group of switching devices during different state transitions further comprises:

when transitioning from a midpoint voltage state to a positive or negative voltage state, turning off the second and third IGBT modules while maintaining an alternate current path through the fifth and sixth IGBT modules, thereby effectively decreasing an amount of energy dissipated on the second and third IGBT modules during turn off.

Clause 6. The method of clause 5, wherein operating the first and second groups of switching devices according to the multi-state deadtime to allow the first group of switching devices to switch differently than the second group of switching devices during different state transitions further comprises:

when transitioning from the midpoint voltage state to the positive or negative voltage state and once the second and third IGBT modules are turned off, turning off the fifth and sixth IGBT modules, thereby effectively interrupting a phase module current.

Clause 7. The method of clause 6, wherein transitioning from the midpoint voltage state to the positive or negative voltage state occurs regardless of a current direction of the fifth and sixth IGBT modules.

Clause 8. The method of clause 6, wherein operating the first and second groups of switching devices according to the multi-state deadtime to allow the first group of switching devices to switch differently than the second group of switching devices during different state transitions further comprises: when transitioning from the positive or negative voltage state to the midpoint voltage state, turning on the second and third IGBT modules and the fifth and sixth IGBT modules at the same time.

Clause 9. The method of any of the preceding clauses, further comprising operating the plurality of switching devices at the multi-state deadtime via a plurality of gate drivers.

Clause 10. The method of any of the preceding clauses, wherein the multi-level bridge power converter is a three-level bridge power converter, and wherein the electrical power system comprises a wind turbine power system, a solar power system, an energy storage power system, or combinations thereof.

Clause 11. An electrical power system, comprising: a doubly-fed induction generator having a rotor and a stator, the stator providing AC power to a stator bus; a multi-level bridge power converter coupled to the rotor of the doubly-fed induction generator, the power converter comprising a first converter coupled to a second converter via a DC link, at least one of the first converter or the second converter comprising a plurality of switching devices arranged in one of a neutral point clamped topology or an active neutral point clamped topology, the plurality of switching devices comprising a first group of switching devices and a second group of switching devices;
a controller communicatively coupled to the power converter, the controller comprising at least one processor configured to implement a plurality of operations, the plurality of operations comprising:
providing a multi-state deadtime for the first and second groups of switching devices of the power converter that changes based on different state transitions of the power converter; and
operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter.

Clause 12. The system of clause 11, wherein the plurality of switching devices comprises, at least, a plurality of insulated gate bipolar transistor (IGBT) modules, wherein each of the plurality of IGBT modules comprises at least one IGBT switch and at least one antiparallel diode.

Clause 13. The system of clause 12, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode.

Clause 14. The system of clause 13, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

Clause 15. The system of clause 14, wherein operating the first and second groups of switching devices according to the multi-state deadtime to allow the first group of switching devices to switch differently than the second group of switching devices during different state transitions further comprises:
when transitioning from a midpoint voltage state to a positive or negative voltage state, turning off the second and third IGBT modules while maintaining an alternate current path through the fifth and sixth IGBT modules, thereby effectively decreasing an amount of energy dissipated on the second and third IGBT modules during turn off.

Clause 16. The system of clause 15, wherein operating the first and second groups of switching devices according to the multi-state deadtime to allow the first group of switching devices to switch differently than the second group of switching devices during different state transitions further comprises: when transitioning from the midpoint voltage state to the positive or negative voltage state and once the second and third IGBT modules are turned off, turning off the fifth and sixth IGBT modules, thereby effectively interrupting a phase module current.

Clause 17. The system of clause 16, wherein transitioning from the midpoint voltage state to the positive or negative voltage state occurs regardless of a current direction of the fifth and sixth IGBT modules.

Clause 18. The system of clause 16, wherein operating the first and second groups of switching devices according to the multi-state deadtime to allow the first group of switching devices to switch differently than the second group of switching devices during different state transitions further comprises: when transitioning from the positive or negative voltage state to the midpoint voltage state, turning on the second and third IGBT modules and the fifth and sixth IGBT modules at the same time.

Clause 19. The system of clauses 11-18, further comprising operating the plurality of switching devices at the multi-state deadtime via a plurality of gate drivers.

Clause 20. The system of clauses 11-19, wherein the multi-level bridge power converter is a three-level bridge power converter, and wherein the electrical power system comprises a wind turbine power system, a solar power system, an energy storage power system, or combinations thereof.

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a multi-level bridge power converter of an electrical power system connected to a power grid, the power converter having a first converter coupled to a second converter via a DC link, the method comprising:
providing a plurality of switching devices of the power converter in one of a neutral point clamped topology or an active neutral point clamped topology, the plurality of switching devices comprising a first group of switching devices and a second group of switching devices;
providing a multi-state deadtime for the first and second groups of switching devices of the power converter that changes based on different state transitions of the power converter; and
operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter.

2. The method of claim 1, wherein the plurality of switching devices comprises, at least, a plurality of insulated gate bipolar transistor (IGBT) modules, wherein each of the plurality of IGBT modules comprises at least one IGBT switch and at least one antiparallel diode.

3. The method of claim 2, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode.

4. The method of claim 3, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

5. The method of claim 4, wherein operating the first and second groups of switching devices according to the multi-state deadtime to allow the first group of switching devices to switch differently than the second group of switching devices during different state transitions further comprises:
when transitioning from a midpoint voltage state to a positive or negative voltage state, turning off the second and third IGBT modules while maintaining an alternate current path through the fifth and sixth IGBT modules, thereby effectively decreasing an amount of energy dissipated on the second and third IGBT modules during turn off.

6. The method of claim 5, wherein operating the first and second groups of switching devices according to the multi-state deadtime to allow the first group of switching devices to switch differently than the second group of switching devices during different state transitions further comprises:
when transitioning from the midpoint voltage state to the positive or negative voltage state and once the second and third IGBT modules are turned off, turning off the fifth and sixth IGBT modules, thereby effectively interrupting a phase module current.

7. The method of claim 6, wherein transitioning from the midpoint voltage state to the positive or negative voltage state occurs regardless of a current direction of the fifth and sixth IGBT modules.

8. The method of claim 6, wherein operating the first and second groups of switching devices according to the multi-state deadtime to allow the first group of switching devices to switch differently than the second group of switching devices during different state transitions further comprises:
when transitioning from the positive or negative voltage state to the midpoint voltage state, turning on the second and third IGBT modules and the fifth and sixth IGBT modules at the same time.

9. The method of claim 1, further comprising operating the plurality of switching devices at the multi-state deadtime via a plurality of gate drivers.

10. The method of claim 1, wherein the multi-level bridge power converter is a three-level bridge power converter, and wherein the electrical power system comprises a wind turbine power system, a solar power system, an energy storage power system, or combinations thereof.

11. An electrical power system, comprising:
a doubly-fed induction generator having a rotor and a stator, the stator providing AC power to a stator bus;
a multi-level bridge power converter coupled to the rotor of the doubly-fed induction generator, the power converter comprising a first converter coupled to a second converter via a DC link, at least one of the first converter or the second converter comprising a plurality of switching devices arranged in one of a neutral point clamped topology or an active neutral point clamped topology, the plurality of switching devices comprising a first group of switching devices and a second group of switching devices;
a controller communicatively coupled to the power converter, the controller comprising at least one processor configured to implement a plurality of operations, the plurality of operations comprising:
providing a multi-state deadtime for the first and second groups of switching devices of the power converter that changes based on different state transitions of the power converter; and
operating the first and second groups of switching devices according to the multi-state deadtime to allow the first group of switching devices to switch differently than the second group of switching devices during the different state transitions, thereby decreasing voltage overshoots on the first group of switching devices during one or more of the different state transitions and providing safe transition between commutation states of the power converter.

12. The system of claim 11, wherein the plurality of switching devices comprises, at least, a plurality of insulated gate bipolar transistor (IGBT) modules, wherein each of the plurality of IGBT modules comprises at least one IGBT switch and at least one antiparallel diode.

13. The system of claim 12, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode.

14. The system of claim 13, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

15. The system of claim 14, wherein operating the first and second groups of switching devices according to the multi-state deadtime to allow the first group of switching devices to switch differently than the second group of switching devices during different state transitions further comprises:
   when transitioning from a midpoint voltage state to a positive or negative voltage state, turning off the second and third IGBT modules while maintaining an alternate current path through the fifth and sixth IGBT modules, thereby effectively decreasing an amount of energy dissipated on the second and third IGBT modules during turn off.

16. The system of claim 15, wherein operating the first and second groups of switching devices according to the multi-state deadtime to allow the first group of switching devices to switch differently than the second group of switching devices during different state transitions further comprises:
   when transitioning from the midpoint voltage state to the positive or negative voltage state and once the second and third IGBT modules are turned off, turning off the fifth and sixth IGBT modules, thereby effectively interrupting a phase module current.

17. The system of claim 16, wherein transitioning from the midpoint voltage state to the positive or negative voltage state occurs regardless of a current direction of the fifth and sixth IGBT modules.

18. The system of claim 16, wherein operating the first and second groups of switching devices according to the multi-state deadtime to allow the first group of switching devices to switch differently than the second group of switching devices during different state transitions further comprises:
   when transitioning from the positive or negative voltage state to the midpoint voltage state, turning on the second and third IGBT modules and the fifth and sixth IGBT modules at the same time.

19. The system of claim 11, further comprising operating the plurality of switching devices at the multi-state deadtime via a plurality of gate drivers.

20. The system of claim 11, wherein the multi-level bridge power converter is a three-level bridge power converter, and wherein the electrical power system comprises a wind turbine power system, a solar power system, an energy storage power system, or combinations thereof.

* * * * *